(12) United States Patent
Timm et al.

(10) Patent No.: US 10,417,622 B2
(45) Date of Patent: Sep. 17, 2019

(54) CONFIGURABLE INVOICE MATCHING OPTIMIZATION SYSTEM

(71) Applicant: Oracle International Corporation, Redwood Shores, CA (US)

(72) Inventors: Chad Jeffrey Timm, Minneapolis, MN (US); Erick Miles Rowe, Chaska, MN (US); Gerald Joseph Hanson, Apple Valley, MN (US); Jurgen Riley Schroeder, Plymouth, MN (US)

(73) Assignee: Oracle International Corporation, Redwood Shores, CA (US)

( * ) Notice: Subject to any disclaimer, the term of this patent is extended or adjusted under 35 U.S.C. 154(b) by 108 days.

(21) Appl. No.: 14/083,496

(22) Filed: Nov. 19, 2013

(65) Prior Publication Data
US 2015/0142646 A1  May 21, 2015

(51) Int. Cl.
*G06Q 20/14* (2012.01)
*G06Q 20/10* (2012.01)

(52) U.S. Cl.
CPC ........... *G06Q 20/14* (2013.01); *G06Q 20/102* (2013.01)

(58) Field of Classification Search
CPC ......... G06F 17/50; G06F 17/10; G06Q 20/14; G06Q 20/102
See application file for complete search history.

(56) References Cited

U.S. PATENT DOCUMENTS

| | | | | |
|---|---|---|---|---|
| 6,098,052 A | * | 8/2000 | Kosiba | G06Q 10/10 235/379 |
| 6,370,522 B1 | * | 4/2002 | Agarwal | G06F 16/24547 |
| 6,882,986 B1 | * | 4/2005 | Heinemann | G06Q 20/10 705/24 |
| 7,191,150 B1 | * | 3/2007 | Shao et al. | 705/38 |
| 7,519,553 B2 | * | 4/2009 | Abe | G06Q 40/00 705/30 |

(Continued)

OTHER PUBLICATIONS

Olson, Rich, "Oracle® Retail Invoice Matching User Guide", Dec. 2009, Oracle, 1-119.*

(Continued)

*Primary Examiner* — Christopher Bridges
(74) *Attorney, Agent, or Firm* — Potomac Law Group, PLLC

(57) ABSTRACT

A system is provided that automatically optimizes a configurable invoice matching engine. The system receives a set of historical invoice matching data that includes invoices classified by the invoice matching engine and resolution actions initiated by the invoice matching engine. The system further calculates a current overall cost associated with the invoice matching engine initiating resolution actions based on current invoice matching tolerance parameters, current invoice matching action parameters, fixed factor parameters, and historical factor parameters. The system further calculates alternate overall costs associated with the invoice matching engine initiating resolution actions based on alternate invoice matching tolerance parameters. The system further determines optimal invoice matching tolerance parameters based on comparing the current overall cost with the alternate overall costs. The system further adjusts the current invoice matching tolerance parameters to the optimal invoice matching tolerance parameters.

18 Claims, 6 Drawing Sheets

(56) References Cited

U.S. PATENT DOCUMENTS

| | | | |
|---|---|---|---|
| 7,801,878 B2* | 9/2010 | Hayes | G06Q 20/102 |
| | | | 707/708 |
| 7,865,413 B2* | 1/2011 | Furphy | G06Q 10/0875 |
| | | | 705/29 |
| 8,326,754 B2* | 12/2012 | Bandych | G06Q 20/102 |
| | | | 705/30 |
| 8,429,037 B2* | 4/2013 | Stone | G06Q 10/087 |
| | | | 705/28 |
| 2002/0099585 A1* | 7/2002 | Locke | G06Q 10/06375 |
| | | | 705/7.37 |
| 2004/0034578 A1 | 2/2004 | Oney et al. | |
| 2005/0075960 A1* | 4/2005 | Leavitt | G06Q 20/00 |
| | | | 705/35 |
| 2006/0143042 A1* | 6/2006 | Gragg | G06Q 10/10 |
| | | | 705/2 |
| 2010/0250405 A1 | 9/2010 | DeWitt et al. | |
| 2013/0226738 A1 | 8/2013 | Sharma et al. | |
| 2014/0282352 A1* | 9/2014 | Alonzo et al. | 717/101 |

OTHER PUBLICATIONS

Olson, Rich, "Oracle® Retail Invoice Matching User Guide", 2009, Oracle (Year: 2009).*

Oracle Data Sheet, "Oracle Retail Invoice Matching", http://www.oracle.com/us/products/applications/062068.pdf, last downloaded Nov. 11, 2013.

* cited by examiner

ORACLE    Fusion Applications

Personalization- Help- Sign Out    John Smith

Home   Navigator-   Recent Items-   Favorites-   Watchlist-         Search [List Item ▼] [Valve ▼] Advanced <Work Area Name>

☑ Retail Invoice Match    Oracle Retail Invoice Match Parameters — 200

Invoice Match Tasks           Screen to evaluate and update parameters
- Review Historical Matching
  Parameters
- Setup data
- Resolve Discrepancies
- Review Tolerance
- Create Financial Documents

| Global Parameters | Fixed Factor Settings | Historical Factors | Item Parameters |

Vendor Historical Parameters

Search

ACME Widgets | ABC Beverages | XYZ Clothing | ETC....

| Fixed Factors | Value | Pier |
|---|---|---|
| Average Cost of Researching Cost Discrepancies | $2.05 | Discrepancy |
| Average Cost of Researching Quantity Discrepancies | $1.22 | Discrepancy |
| Average Cost of Negotiating Cost Discrepancies | $4.56 | Invoice |
| Average Cost of Negotiating Quantity Discrepancies | $5.33 | Invoice |

— 210

☒ Retail Application "A"

Fig. 2

| ORACLE | Fusion Applications | | | Personalization- | Help- | Sign Out | John Smith |
|---|---|---|---|---|---|---|---|

Oracle Retail Invoice Match Parameters — 300

Screen to evaluate and update parameters

| Home | Navigator- | Recent Items- | Favorites- | Watchlist- | | Search | List Item | ▼ Valve | ▼ Advanced |
|---|---|---|---|---|---|---|---|---|---|

<Work Area Name>

☑ Retail Invoice Match

Invoice Match Tasks
- Review Historical
  Matching Parameters
- Setup data
- Resolve Discrepancies
- Review Tolerance
- Create Financial Documents

| Global Parameters | Fixed Factor Settings | Historical Factors | Item Parameters |
|---|---|---|---|

Vendor Historical Parameters

Search

ACME Widgets | ABC Beverages | XYZ Clothing | ETC.....

| Historical Factors (Calculated) | Calculated Value | Manual Edits |
|---|---|---|
| % of Exact Match Invoices | 62% | |
| % of Matches within Tolerance | 11% | |
| % of Invoices resulting in cost discrepancy | 17% | |
| % of Invoices in resulting in quantity discrepancy | 15% | |
| Average Unit Cost deviation on Cost Discrepancies | $1.25 | |
| Average Unit deviation on Quantity Discrepancies | 1.7 | |
| % of Disputed Debit Memos | 10% | |
| Average payment deviation from invoiced when discrepancy is researched | $12,234 | |
| Average payment deviation from expected when discrepancy is researched | $8,256 | |
| | .05% | |

310

☑ Retail Application "A"

Fig. 3

| Cycle | Cycle Description | $ Written Off | Results | | | | |
|---|---|---|---|---|---|---|---|
| | | | $ Spent Researching-Paid Invoice Amount | $ Spent Researching - Paid Expected Amount | Missed Discount $ due to late payment | Total | Delta |
| Historical As-Was | Actual results, calculated using invoice data and historical parameter settings | $1,450 | $750 | $450 | $700 | $3,350 | $0 |
| Cycle 1 | Increase supplier tolerance by 2%, resulting in more write-offs but a reduction in research time and missed payments | $1,725 | $640 | $350 | $600 | $3,315 | -$35 |
| Cycle 2 | Increase supplier tolerance by additional 2% (4% total) | $1,895 | $540 | $340 | $550 | $3,325 | -$25 |
| Cycle 3 | Increase supplier tolerance by additional 2% (6% total) | $2,100 | $510 | $325 | $500 | $3,435 | $85 |
| Cycle 4 | Increase supplier tolerance by additional 2% (8% total) | $2,400 | $480 | $280 | $410 | $3,570 | $220 |
| Cycle 5 | Increase supplier tolerance by additional 2% (10% total) | $2,600 | $440 | $250 | $355 | $3,655 | $305 |
| Cycle 6 | Decrease supplier tolerance by 2%, resulting in fewer write-offs but an increase in research time and missed payments | $1,400 | $790 | $480 | $720 | $3,390 | $40 |
| Cycle 7 | Decrease supplier tolerance by additional 2% (4% total) | $1,320 | $810 | $495 | $740 | $3,365 | $15 |
| Cycle 8 | Decrease supplier tolerance by additional 2% (6% total) | $1,300 | $830 | $505 | $750 | $3,385 | $35 |
| Cycle 9 | Decrease supplier tolerance by additional 2% (8% total) | $1,100 | $840 | $515 | $780 | $3,235 | -$115 |
| Cycle 10 | Decrease supplier tolerance by additional 2% (10% total) | $1,050 | $850 | $540 | $820 | $3,270 | -$80 |

CONFIGURABLE INVOICE MATCHING OPTIMIZATION SYSTEM

FIELD

One embodiment is directed to a computer system, and more particularly, to a computer system that matches invoices.

BACKGROUND

Typically, invoice processing involves the handling of incoming invoices from arrival to post. Invoices are generally grouped into two types: 1) invoices that are associated with a request or purchase order; and 2) invoices that do not have an associated request or purchase order. Thus, as part of the processing of the invoice, the invoice is typically matched against a corresponding request or purchase order to determine whether the invoice is identical or similar to the corresponding request or purchase order (e.g., the quantity and/or amount indicated on the invoice is identical or similar to the quantity and/or amount indicated on the corresponding request or purchase order).

Technology has further enabled the automation of invoice processing from arrival to post. In an automatic process, the data of the invoice can be extracted or captured from the invoice and sent to an automatic invoice matching system (also identified as an "invoice matching engine" or "configurable invoice matching engine"). Once the data of the invoice has been extracted or captured, the automatic invoice matching system can attempt to match the data of the invoice with data of a corresponding request or purchase order. Many automatic invoice matching systems are integrated into overall organizational enterprise resource planning ("ERP") systems.

Traditionally, invoice matching systems perform the invoice matching process using a combination of suppliers, purchase documents, and locations. The objective of this process is to ensure invoices sent from suppliers for goods sold accurately reflect the actual goods received on purchase documents prior to authorizing the payment of the invoices. An ideal invoice matching system can ensure both the accuracy of invoices as well as achieving a high rate of automated invoice matching which eliminates the need for user intervention. This elimination of user intervention can translate to direct cost savings for the purchaser.

Traditional invoice matching systems generally provide for some points of configuration but leave it to a user to determine how best to configure the invoice matching system. This can lead to a lot of trial-and-error which is both time consuming and does not offer a guarantee as to when an optimal level has been achieved. Also, as business evolves, the need to adjust these configurations can arise frequently, which can result is constant monitoring of the points of configuration.

SUMMARY

One embodiment is directed to a system that automatically optimizes a configurable invoice matching engine. The system receives historical invoice matching data that includes invoices classified by the invoice matching engine and resolution actions initiated by the invoice matching engine. The invoice matching engine classifies the invoices based on current invoice matching tolerance parameters. The invoice matching engine initiates the resolution actions based on current invoice matching action parameters. The system further defines fixed factor parameters that define cost values associated with the invoice matching engine initiating resolution actions. The system further calculates historical factor parameters that define metric values based on the historical invoice matching data. The system further calculates a current overall cost associated with the invoice matching engine initiating resolution actions based on the current invoice matching tolerance parameters, the current invoice matching action parameters, the fixed factor parameters, and the historical factor parameters. The system further calculates alternate overall costs associated with the invoice matching engine initiating resolution actions based on alternate invoice matching tolerance parameters. The system further determines optimal invoice matching tolerance parameters based on comparing the current overall cost with the alternate overall costs. The system further adjusts the current invoice matching tolerance parameters to the optimal invoice matching tolerance parameters.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 2 illustrates an example user interface for defining a set of fixed factor parameters, according to an embodiment of the invention.

FIG. 3 illustrates an example user interface for viewing a set of historical factor parameters, according to an embodiment of the invention.

FIG. 4 illustrates example results of calculating a current overall cost based on a current set of invoice matching parameters and alternate overall costs based on alternate sets of invoice matching parameters, according to an embodiment of the invention.

DETAILED DESCRIPTION

According to an embodiment, a system is provided that can automatically and systematically adjust a set of invoice matching parameters of an automatic and configurable invoice matching system (also identified as an "automatic and configurable invoice matching engine," "configurable invoice matching engine," or "invoice matching engine") to achieve optimal invoice matching rates. The system can adjust the set of invoice matching parameters by automatically leveraging a set of historical invoice matching data. The historical invoice matching data can include previous invoices classified by the invoice matching engine as part of a process of automatically matching the invoices. The historical invoice matching data can further include previous resolution actions initiated by the invoice matching engine as part of the process of automatically matching the invoices. The historical invoice matching data can be used to automatically adjust a current set of invoice matching parameters utilized by the invoice matching engine to an optimal set of invoice matching parameters. This can automatically improve the automatic invoice matching of the invoice matching engine, and can result in optimal automatic matching rates for the invoice matching engine.

Figure 1:
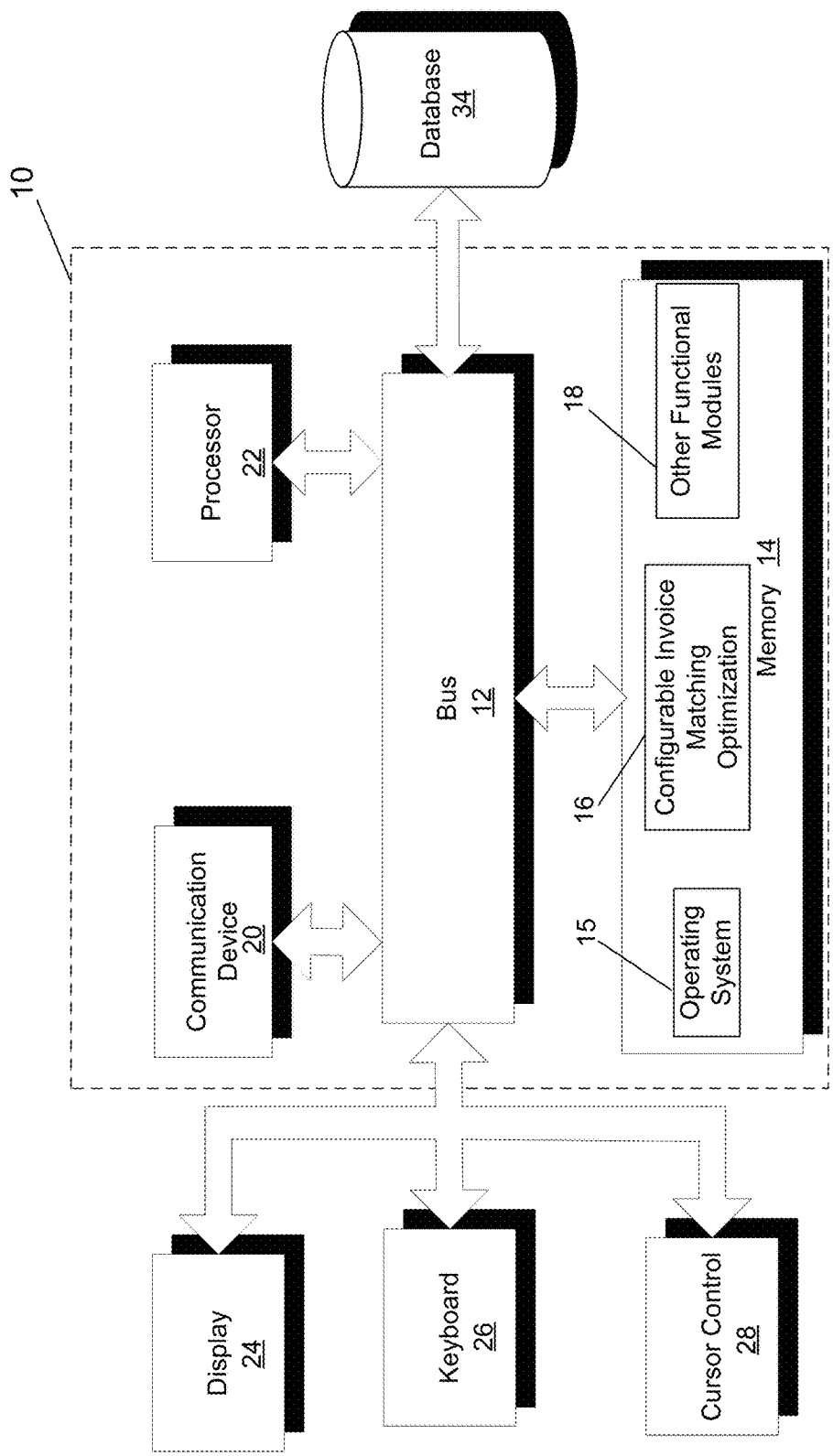
FIG. 1 illustrates a block diagram of a system that can implement an embodiment of the invention.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a configurable invoice matching optimization module 16, as well as other functional modules 18. Operating system 15 can provide an operating system functionality for system 10. Configurable invoice matching optimization module 16 can provide functionality for automatically optimizing an automatic and configurable invoice matching engine. In certain embodiments, configurable invoice matching optimization module 16 can comprise a plurality of modules, where each module provides specific individual functionality for automatically optimizing an automatic and configurable invoice matching engine. System 10 can also be part of a larger system. Thus, system 10 can include one or more additional functional modules 18 to include the additional functionality. For example, functional modules 18 may include modules that provide additional functionality, such as functionality of a "Retail Invoice Matching" product by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Typically, an automatic and configurable invoice matching engine has various invoice matching parameters that are used to determine whether an invoice matches to a purchase document (such as a purchase order or a receipt), and, in the case of a discrepancy, to determine whether to automatically pay the invoice as it currently exists, or whether to initiate a resolution action to resolve the discrepancy. A match of an invoice and a purchase document can typically be done on several aspects. One example aspect is cost, either at a stock keeping unit ("SKU")-by-SKU level or an invoice total amount level. Another example aspect is quantity, either at a SKU-by-SKU level or at a total invoice level. Other aspects may also be considered to determine a match, such as a supplier (or a group of related suppliers), purchase document identifiers, dates, etc. While these aspects are not typically the key aspects being matched, these aspects can help in determining the set of "documents" (i.e., invoices and purchase documents) to be considered for a match.

An invoice matching engine can match invoices to purchase documents by classifying an invoice as "Exactly Matched" (i.e., an "exact" match), "Matched Within Tolerance" (i.e., a match "within tolerance"), or "Not Matched" (i.e., a "non-match"). When an invoice is "exactly" matched with a purchase document by the invoice matching engine, the invoice matching engine has determined that the costs and quantities associated with the invoice are an exact match to the costs and quantities associated with a purchase document. This match may occur based on summary-level information or detailed SKU-by-SKU level information. Typically, when an invoice is classified as an exact match, the invoice matching engine will mark the invoice as "matched," along with the purchase document that the invoice was matched to, and then the invoice matching engine will process the invoice for payment.

When an invoice does not match exactly, but does match a purchase document "within tolerance," several options for resolution actions can exist. Tolerances allow a cost amount and/or a quantity amount of an invoice to be either greater than or less than a cost amount and/or a quantity amount of a purchase document. Percentage, amount, or value tolerances can be set in order to determine whether an invoice matches within tolerance or not. Different tolerances are usually set for whether any discrepancy is "in favor of" the retailer or the supplier. The retailer's primary concern is with paying too much, so the tolerances in favor of the supplier are normally tighter and require greater scrutiny to ensure an optimal cost to the retailer.

Typically, if a cost amount and/or a quantity amount of an invoice is less than expected based on a cost amount and/or a quantity amount of a purchase document, the retailer would accept the invoice "as is," as the retailer would be paying a reduced cost. As a result, the tolerances in favor of the retailer would typically be wider than tolerances in favor the supplier. However, if the cost amount and/or the quantity amount of the invoice is greater than the cost amount and/or the quantity amount of the purchase document, then either a unit cost on the invoice is greater than a unit cost on the purchase document, the quantity on the invoice is greater than the quantity on the purchase document, or both. In this situation, the retailer will generally want to take some sort of resolution action to resolve the differences unless an estimated cost of resolving the differences would exceed an actual cost of simply paying the over-billed amount. Various options can exist for "within tolerance" matches, and several levels of tolerance may be used. Often, the resolution action taken for "within tolerance" matches can be automated to reduce a cost involved in researching the discrepancy and taking a manual action to resolve the discrepancy. For example, if a cost per unit on an invoice is only slightly above an expected cost based on a purchase document, and an overall cost discrepancy is only several dollars, the retailer may choose to accept the additional cost. The invoice matching engine can automatically pay the invoice and account for the difference as an additional expense. In contrast, if a cost per unit on an invoice is only slightly above an expected cost based on a purchase document, and the overall cost discrepancy is several hundred dollars, the invoice matching engine can automatically generate a "debit memo," where the retailer is taking a deduction and paying the amount that they expected rather than invoiced amount.

If an invoice cannot be exactly matched, or matched within tolerance, the invoice can be classified as a "non-match." This can normally require manual intervention on the retailer's behalf to investigate the discrepancy, communicate with the supplier, and determine the correct resolution action to be taken. Thus, an invoice matching engine may have multiple levels of tolerances with different resolution actions associated with each tolerance to match their strategy for accuracy, efficiency, and cost savings. The multiple tolerances can be defined by the invoice matching engine using a set of invoice matching tolerance parameters. The multiple resolution actions can be defined by the invoice matching engine using a set of invoice matching action parameters.

Besides the case of exact matches, there is a cost involved with all other invoice matching situations. If the retailer chooses to automatically write off the difference, the retailer is paying more than expected without weighing whether this is the optimal action to take. If the retailer chooses to automatically create a debit memo, the immediate effect is that the retailer will only pay an expected amount, but the supplier may dispute the unilaterally issued debit note. This dispute can result in more work on behalf of the retailer to manually research and resolve the issue, which will result in a cost. While this will not happen in all cases, this can be expected in a percentage of cases that can vary by supplier. Additionally, any cases that do not match within tolerance can require manual intervention at an additional cost to the retailer. Also, any cases that require additional time to resolve may result in the retailer missing a deadline for any prompt payment discounts, which can also result in an additional cost.

All of these factors are typically taken into consideration when a retailer develops an invoice matching strategy, and configures the retailer's tolerance levels and desired resolution actions. Based on the invoice matching strategy, the retailer may be required to manually configure a set of invoice matching tolerance parameters and a set of invoice matching action parameters for an invoice matching engine. However, the manual configuration of the invoice matching tolerance parameters and the invoice matching action parameters are typically guesswork, or, at best, are educated guesswork or an "art" learned over time. Most retailers have no idea if making manual adjustments to their invoice matching tolerance parameters and their invoice matching action parameters lead to cost saving or additional expenses. Moreover, they have little basis on which to make these manual adjustments, and the factors previously mentioned can change over time.

According to an embodiment, an automatic and configurable invoice matching engine can be automatically configured to utilize an optimal set of invoice matching parameters, such as an optimal set of invoice matching tolerance parameters and/or an optimal set of invoice matching action parameters. A configurable invoice matching optimization algorithm can be utilized to analyze a set of historical invoice matching data, where the historical invoice matching data can include previous invoices classified by the invoice matching engine and previous resolution actions initiated by the invoice matching engine. The historical invoice matching data can be stored in a data storage, such as a data warehouse, where the algorithm can retrieve the historical invoice matching data when needed. The algorithm can further utilize additional parameters that put a value on different types of resolution action options, such as an estimated cost of manually researching discrepancies, an estimated cost of negotiating with suppliers, a time value of money, etc. Such parameters can include a set of fixed factor parameters that define cost values associated with the invoice matching engine initiating resolution actions. Such parameters can also include a set of historical factor parameters that define metric values based on the historical invoice matching data. Such historical factor parameters can be broken down by supplier and/or item type.

According to the embodiment, the algorithm can then calculate a current overall cost associated with the invoice matching engine initiating resolution actions based on the historical invoice matching data and a current set of invoice matching parameters. The algorithm can further execute multiple alternate scenarios and calculate multiple alternate overall costs associated with the invoice matching engine initiating resolution actions based on the historical invoice matching data and multiple alternate sets of invoice matching parameters. The algorithm can further determine an optimal set of invoice matching parameters by comparing the current overall cost with the alternate overall costs. Such optimal invoice matching parameters can be broken down by supplier, item type, overall value of an invoice and/or overall value of a discrepancy. In short, the algorithm can identify an optimal set of invoice matching parameters that result in a lowest cost to a retailer given the historical invoice matching data. The algorithm can further automatically update the invoice matching parameters from the current invoice matching parameters to the optimal invoice matching parameters.

In certain embodiments, as previously described, a set of invoice matching parameters can include a set of invoice matching tolerance parameters. The set of invoice matching tolerance parameters define whether an invoice matching engine classifies an invoice as an exact match with a purchase document, a match within tolerance with the purchase document, or a non-match with the purchase document. In certain embodiments, the set of invoice matching tolerance parameters can include a cost tolerance parameter and a quantity tolerance parameter. A cost tolerance parameter defines a cost amount threshold that determines an amount that a cost amount of an invoice can deviate from a cost amount of a purchase document, where the invoice is still considered by the invoice matching engine to match the purchase document within tolerance. The cost amount threshold can be a percentage or an amount. Further, the cost amount of the invoice can be the cost of an item of the invoice, or a total cost of the invoice. A quantity tolerance parameter defines a quantity amount threshold that determines an amount that a quantity amount of an invoice can deviate from a quantity amount of a purchase document, where the invoice is still considered by the invoice matching engine to match the purchase document within tolerance. The quantity amount threshold can be a percentage or a value. Further, the quantity amount of the invoice can be the quantity of an item of the invoice, or a total quantity of the invoice.

In certain embodiments, as previously described, a set of invoice matching parameters can further include a set of invoice matching action parameters. The invoice matching action parameters define a resolution action that an invoice matching engine initiates in response to classifying an invoice. Example resolution actions include: automatically paying an invoiced amount of the invoice, automatically paying an expected amount of the invoice and automatically generating a debit memo for a difference of the invoiced amount and the expected amount, and manually resolving a discrepancy between the invoice and a purchase document. In certain embodiments, the set of invoice matching action parameters can include an exact match action parameter, a tolerance match action parameter, and a non-match action parameter. An exact match action parameter is a parameter that defines a resolution action that an invoice matching engine initiates in response to classifying an invoice as an exact match with a purchase document. A tolerance match action parameter is a parameter that defines a resolution action that an invoice matching engine initiates in response to classifying an invoice as a match within tolerance with a purchase document. A non-match action parameter is a parameter that defines a resolution action that an invoice matching engine initiates in response to classifying an invoice as a non-match with a purchase document.

In some embodiments, the algorithm can utilize a set of processing parameters that define how much historical invoice matching data is processed, and at what level of granularity the historical invoice matching data is processed. An example of a processing parameter is a historical invoice matching data parameter. A historical invoice matching data parameter is a parameter that defines a time period (e.g., a number of months or years), where the time period is used to define a set of the historical invoice matching data. For example, the set of the historical invoice matching data can be defined so that the invoices of the historical invoice matching data have an invoice date within the time period defined by the historical invoice matching data parameter. As another example, the set of the historical invoice matching data can be defined so that the resolution actions of the historical invoice matching data have a resolution date within the time period defined by the historical invoice matching data parameter.

Another example of a processing parameter is a processing level parameter. A processing level parameter is a parameter that defines a level of granularity for calculations of an overall cost to a retailer based on a set of invoice matching parameters. Such calculations are further described below in greater detail. By increasing a granularity level to a more granular level, a more optimal overall cost can be calculated, as the calculations can take into account differences that occur between suppliers and item types. In contrast, by decreasing a granularity level to a less granular level, system performance of the invoice matching engine can be improved, as the invoice matching engine requires a fewer number of iterations to calculate the overall cost. Example granularity levels, according to an embodiment, include a global level, a supplier level, and a supplier/item type level. When the processing level parameter is set to a global level, the invoice matching engine can calculate an overall cost for all suppliers and item types, and thus, can optimize a set of invoice matching parameters for all suppliers and item types. A global level is the least granular level of the three granularity levels. When the processing level parameter is set to a supplier level, the invoice matching engine can calculate an overall cost for each supplier, and thus, can optimize a set of invoice matching parameters for each supplier. A supplier level is neither the least granular level nor the most granular level of the three granular levels. When the processing level parameter is set to a suppler/item type level, the invoice matching engine can calculate an overall cost for each supplier and item type, and thus, can optimize a set of invoice matching parameters for each supplier and item type. A supplier/item type level is the most granular level of the three granular levels.

According to certain embodiments, as previously described, a configurable invoice matching optimization algorithm can utilize a set of fixed factor parameters that define cost values associated with invoice matching engine initiating resolution actions. The fixed factor parameters can be defined by a user of an invoice matching engine. In certain embodiments, the user can define the fixed factor parameters using a user interface associated with the invoice matching engine, as further described below in greater detail in conjunction with FIG. 2. In alternate embodiments, the invoice matching engine can calculate the fixed factor parameters based on the historical invoice matching data, when the historical invoice matching data is captured for each of the fixed factor parameters. For example, if the invoice matching engine captures a number of hours spent resolving discrepancies, the invoice matching engine can calculate an average over a specified time period. The fixed factor parameters can be adjusted at any point in time, and the next time the algorithm is executed, the adjusted fixed factor parameters can be utilized.

Examples of fixed factor parameters, according to certain embodiments, can include an average cost of resolving cost discrepancy parameter, an average cost of resolving quantity discrepancy parameter, and a time value of money parameter. An average cost of resolving cost discrepancy parameter is a parameter that defines an average cost of resolving a cost discrepancy. In some embodiments, an average cost of resolving cost discrepancy parameter can be broken down into two parameters: an average cost of researching cost discrepancy parameter and an average cost of negotiating cost discrepancy parameter. An average cost of researching cost discrepancy parameter can be defined as an average number of hours spent researching each cost discrepancy multiplied by an average user hourly wage. An average cost of negotiating cost discrepancy can be defined as an average number of hours spent negotiating each cost discrepancy with a supplier multiplied by an average user hourly wage.

An average cost of resolving quantity discrepancy parameter is a parameter that defines an average cost of resolving a quantity discrepancy. In some embodiments, an average cost of resolving quantity discrepancy parameter can be broken down into two parameters: an average cost of researching quantity discrepancy parameter and an average cost of negotiating quantity discrepancy parameter. An average cost of researching quantity discrepancy parameter can be defined as an average number of hours spent researching each quantity discrepancy multiplied by an average user hourly wage. An average cost of negotiating quantity discrepancy can be defined as an average number of hours spent negotiating each quantity discrepancy with a supplier multiplied by an average user hourly wage.

A time value of money parameter can define a value of money over time (i.e., an interest rate for money). An example is a value of a dollar paid today versus a value of a dollar paid in 90 days, where this is a discount realized by paying within 90 days.

FIG. 2 illustrates an example user interface 200 for defining a set of fixed factor parameters 210, according to an embodiment of the invention. According to the embodiment, fixed factor parameters 210 includes an average cost of researching cost discrepancy parameter (i.e., "Average Cost of Researching Cost Discrepancies"), an average cost of researching quantity discrepancy parameter (i.e., "Average Cost of Researching Quantity Discrepancies"), an average cost of negotiating cost discrepancy parameter (i.e., "Average Cost of Negotiating Cost Discrepancies"), and an average cost of negotiating quantity discrepancy parameter (i.e., "Average Cost of Negotiating Quantity Discrepancies"). A user can utilize user interface 200 to define an amount for each of these parameters. In the illustrated embodiment, the average cost of researching cost discrepancy parameter is defined with an amount of $2.05 and with a "per" value of "discrepancy." Further, the average cost of researching quantity discrepancy parameter is defined with an amount of $1.22 and with a "per" value of "discrepancy." Additionally, the average cost of negotiating cost discrepancy parameter is defined with an amount of $4.56 and a "per" value of "invoice." Further, the average cost of negotiating quantity discrepancy parameter is defined with an amount of $5.33 and a "per" value of "invoice." One of ordinary skill in the art would appreciate that these are example amounts, and that in other embodiments, fixed factor parameters 210 can be defined to have other amounts. Further, in alternate embodiments, an invoice matching engine can calculate amounts for fixed factor parameters 210 based on a set of historical invoice matching data captured for fixed factor parameters. For example, if an invoice matching engine captured a number of hours spent researching cost discrepancies, the invoice matching engine could calculate an amount for the average cost of researching cost discrepancy parameter of fixed factor parameters 210.

According to certain embodiments, as previously described, a configurable invoice matching optimization algorithm can utilize a set of historical factor parameters that define metric values based on historical invoice matching data. The invoice matching engine can calculate the fixed factor parameters based on the historical invoice matching data. In some embodiments, the invoice matching engine can further calculate the fixed factor parameters based on a processing level parameter, where the processing level parameter defines a granularity level to which the historical factor parameters are calculated to. For example, if a processing level parameter is set to a global level, the invoice matching engine can calculate historical factor parameters for all suppliers and item types. If the processing level parameter is set to a supplier level, the invoice matching engine can calculate historical factor parameters for each supplier. If the processing level parameter is set to a suppler/item type level, the invoice matching engine can calculate historical factor parameters for each supplier and item type.

Examples of historical factor parameters, according to certain embodiments, can include a historical exact match parameter, a historical tolerance match parameter, a historical cost discrepancy parameter, a historical quantity discrepancy parameter, a historical average unit cost deviation parameter, a historical average unit quantity deviation parameter, a historical disputed debit memo parameter, a historical average invoice payment deviation parameter, a historical average expected payment deviation parameter, and a historical tolerance setting parameter.

A historical exact match parameter is a parameter that defines a percentage or amount of invoices for a set of historical invoice matching data that were exactly matched. A historical tolerance match parameter is a parameter that defines a percentage or amount of invoices for a set of historical invoice matching data that were matched within tolerance.

Further, a historical cost discrepancy parameter is a parameter that defines a percentage of invoices for a set of historical invoice matching data that resulted in a cost discrepancy. A historical quantity discrepancy parameter is a parameter that defines a percentage of invoices for a set of historical invoice matching data that resulted in a quantity discrepancy.

Additionally, a historical average unit cost deviation parameter is a parameter that defines an average unit cost deviation for cost discrepancies. A historical average unit quantity deviation parameter is a parameter that defines an average unit quantity deviation for quantity discrepancies.

Further, a historical disputed debit memo parameter is a parameter that defines a percentage or amount of invoices for a set of historical invoice matching data that resulted in a debit memo being generated and disputed by a supplier. A "debit memo" is a document that can be generated by an invoice matching engine, and that can be used to resolve a discrepancy between an invoice and a purchase document. The debit memo contains a cost or quantity value that represents either a cost discrepancy or a quantity discrepancy. For example, if an invoice has a cost amount of $10, and a matched purchase document has a cost amount of $8, a debit memo can be created that has an amount of $2 to account for the variance. Ultimately, a supplier may not agree to this resolution and may dispute the debit memo. The retailer must then take a manual action to resolve the dispute with the supplier.

Additionally, a historical average invoice payment deviation parameter is a parameter that defines whether a final deviation between a paid amount and an invoiced amount is greater than, less than, or equal to a cost of resolving any discrepancies. A historical average expected payment deviation parameter is a parameter that defines whether a final deviation between a paid amount and an expected amount is greater than, less than, or equal to a cost of resolving discrepancies. Finally, a historical tolerance setting parameter defines one or more sets of invoice matching tolerance parameters for a set of historical invoice matching data.

FIG. 3 illustrates an example user interface for viewing a set of historical factor parameters 310, according to an embodiment of the invention. According to the embodiment, historical factor parameters 310 include a historical exact match parameter (i.e., "% of Exact Match Invoices"), a historical tolerance match parameter (i.e., "% of Matches within Tolerance"), a historical cost discrepancy parameter (i.e., "% of invoices resulting in cost discrepancy"), a historical quantity discrepancy parameter (i.e., "% of Invoices resulting in quantity discrepancy"), a historical average unit cost deviation parameter ("Average Unit Cost deviation on Cost Discrepancies"), a historical average unit quantity deviation parameter ("Average Unit deviation on Quantity Discrepancies"), a historical disputed debit memo parameter ("% of Disputed Debit Memos"), a historical average invoice payment deviation parameter ("Average payment deviation from invoiced when discrepancy is researched"), and a historical average expected payment deviation parameter ("Average payment deviation from expected when discrepancy is researched"). An invoice matching engine can calculate a percentage, value, or amount for each of these parameters, and user interface 300 can display the calculated percentages, values, and amounts. In the illustrated embodiment: a percentage of 62% is calculated for the historical exact match parameter; a percentage of 11% is calculated for the historical tolerance match parameter; a percentage of 17% is calculated for the historical cost discrepancy parameter; a percentage of 15% is calculated for the historical quantity discrepancy parameter; an amount of $1.25 is calculated for the historical average unit cost deviation parameter; a value of 1.7 is calculated for the historical average unit quantity deviation parameter; a percentage of 10% is calculated for the a historical disputed debit memo parameter; an amount of $12.234 is calculated for the historical average invoice payment deviation parameter; and an amount of $8.256 is calculated for the historical average expected payment deviation parameter. One of ordinary skill in the art would appreciate that these are example percentages, values, and amounts, and that in other embodiments, other percentages, values, and amounts can be calculated for historical factor parameters 310. Further, in alternate embodiments, a user can utilize user interface 300 to manually edit one or more percentages, values, and/or amounts of historical factor parameters 310.

According to the embodiment, the algorithm can calculate a current overall cost to a retailer associated with an initiation of resolution actions by an invoice matching engine. The initiation of the resolution actions results from the invoice matching engine automatically matching invoices using a current set of invoice matching parameters, which can include invoice matching tolerance parameters and invoice matching action parameters. Further, the calculation of the current overall cost can utilize the fixed factor parameters previously described, and/or the historical factor parameters previously described.

More specifically, according to an embodiment, the algorithm can calculate one or more individual cost amounts associated with an initiation of resolution actions by an invoice matching engine. These individual cost amounts can be calculated based on one, some or all of the fixed factor parameters, and/or based on one, some or all of the historical factor parameters. As previously described, the historical factor parameters can be calculated based on historical invoice matching data, where the historical invoice matching data is generated by an invoice matching system when automatically matching invoices using a current set of invoice matching parameters. The algorithm can then sum the one or more individual cost amounts into a current overall cost.

Example individual cost amounts are now described in greater detail. An example individual cost amount is a write-off cost amount that is an amount written off as part of the invoice matching engine initiating resolution actions. The write-off cost amount can further be broken down into an automatic write-off cost amount that is an amount automatically written off after the invoice matching engine matches invoices within tolerance, and a manual write-off cost amount that is an amount manually written off after the invoice matching engine initiates a manual resolution of invoices that it does not match. The manual write-off cost amount can include a cost associated with the manual resolution of invoices, such as the cost to manually research and resolve the discrepancies of the invoices.

Another example individual cost amount is an expected payment resolution amount that is an amount associated with resolution actions initiated by the invoice matching engine that resulted in a payment of an expected amount. Yet another example individual cost amount is an invoiced payment resolution amount that is an amount associated with resolution actions initiated by the invoice matching engine that resulted in a payment of an invoiced amount. The invoiced payment resolution amount can include the additional amount that was paid in excess of the expected amount (i.e., the difference between the paid amount and the expected amount). Another example individual cost amount is an additional payment resolution amount that is an amount associated with resolution actions initiated by the invoice matching engine that resulted in an additional payment of some amount (i.e., a payment of some amount in addition to a previous payment of either an expected amount or an invoiced amount). Yet another example individual cost amount is a payment discount amount that is a payment discount amount not realized as a result of resolution actions initiated by the invoice matching engine that resulted in missing a discount date as defined by the payment terms of an invoice. One of ordinary skill in the art would readily appreciate that these are only example individual cost values according to an example embodiment, and that, in other alternate embodiments, other individual cost values can be calculated.

According to the embodiment, the algorithm can then generate a set of alternate invoice matching parameters by adjusting at least one current invoice matching parameter, where each set of alternate invoice matching parameters can include invoice matching tolerance parameters and invoice matching action parameters. An adjustment of an invoice matching parameter can be an increment or a decrement of a percentage, value, or amount of the invoice matching parameter. The algorithm can then calculate a set of alternate overall costs to a retailer associated with an initiation of resolution actions by an invoice matching engine, where the initiation of the resolution actions results from the invoice matching engine automatically matching invoices using each alternate set of invoice matching parameters, and where each alternate set of invoice matching parameters can include invoice matching tolerance parameters and invoice matching action parameters. Each alternate overall cost can be a sum of one or more alternate individual cost amounts, as previously described.

In accordance with the embodiment, the algorithm can subsequently compare the alternate overall costs, and select an alternate overall cost as an optimal overall cost. The alternate overall cost that is selected as the optimal overall cost can be the smallest overall cost. The algorithm can further select the alternate set of invoice matching parameters that are associated with the selected alternate overall cost as an optimal set of invoice matching parameters. The algorithm can further automatically adjust the current set of invoice matching parameters to the optimal set of invoice matching parameters. An invoice matching system can then further subsequently utilize the optimal set of invoice matching parameters for its automatic invoice matching.

In one embodiment, the aforementioned process can be executed on a periodic basis to update the optimal set of invoice matching parameters based on changes in invoicing patterns at a supplier level. The aforementioned process can also be executed at an even more granular level to make similar determinations based on supplier and/or item type levels in case a supplier provides a wide variety of items, and their invoicing behavior varies across their item types.

FIG. 4 illustrates example results 400 of calculating a current overall cost based on a current set of invoice matching parameters (identified in FIG. 4 as "Historical As-Was") and alternate overall costs based on alternate sets of invoice matching parameters (identified in FIG. 4 as "Cycle 1," "Cycle 2," Cycle 3," "Cycle 4," "Cycle 5," "Cycle 6," "Cycle 7," "Cycle 8," "Cycle 9," and "Cycle 10"), according to an embodiment of the invention. According to the embodiment, a configurable invoice matching engine optimization algorithm can cycle through a set of historical invoice matching data and calculate a series of individual cost amounts with varying sets of invoice matching parameters (i.e., a current set of invoice matching parameters and ten alternate sets of invoice matching parameters). The algorithm can then sum the individual cost amounts into an overall cost for the corresponding set of invoice matching parameters.

According to the illustrated embodiment, the alternate set of invoice match parameters identified in FIG. 4 as "Cycle 1" includes an increase of 2% for one or more invoice matching tolerance parameters. This results in an increase in automatic write-offs initiated by an invoice matching engine, but also results in a decrease in manual research initiated by the invoice matching engine, and further results in a decrease in missed payments. Further, the alternate set of invoice match parameters identified in FIG. 4 as "Cycle 2" includes an increase of 4% for one or more invoice matching tolerance parameters. The alternate set of invoice match parameters identified in FIG. 4 as "Cycle 3" includes an increase of 6% for one or more invoice matching tolerance parameters. The alternate set of invoice match parameters identified in FIG. 4 as "Cycle 4" includes an increase of 8% for one or more invoice matching tolerance parameters. The alternate set of invoice match parameters identified in FIG. 4 as "Cycle 5" includes an increase of 10% for one or more invoice matching tolerance parameters.

Further, the alternate set of invoice match parameters identified in FIG. 4 as "Cycle 6" includes a decrease of 2% for one or more invoice matching tolerance parameters. This results in a decrease in automatic write-offs initiated by an invoice matching engine, but also results in an increase in manual research initiated by the invoice matching engine, and further results in an increase in missed payments. Further, the alternate set of invoice match parameters identified in FIG. 4 as "Cycle 7" includes a decrease of 4% for one or more invoice matching tolerance parameters. The alternate set of invoice match parameters identified in FIG. 4 as "Cycle 8" includes a decrease of 6% for one or more invoice matching tolerance parameters. The alternate set of invoice match parameters identified in FIG. 4 as "Cycle 9" includes a decrease of 8% for one or more invoice matching tolerance parameters. The alternate set of invoice match parameters identified in FIG. 4 as "Cycle 10" includes a decrease of 10% for one or more invoice matching tolerance parameters.

Also in accordance with the embodiment, the algorithm can calculate a series of individual cost amounts for each set of invoice matching parameters. More specifically, for each set of invoice matching parameters, the algorithm can calculate a write-off cost amount (identified in FIG. 4 as "$ Written Off"), an expected payment resolution amount (identified in FIG. 4 as "$ Spent Researching—Paid Invoice Amount"), an invoiced payment resolution amount (identified in FIG. 4 as "$ Spent Researching—Paid Expected Amount"), and a payment discount amount (identified in FIG. 4 as "Missed Discount $ due to late payment"). The algorithm can further calculate an overall cost (identified in FIG. 4 as "Total"), for each set of invoice matching parameters, by summing the write-off cost amount, the expected payment resolution amount, the invoiced payment resolution amount, and the payment discount amount. Further, for each set of invoice matching parameters, the algorithm can calculate a difference (identified in FIG. 4 as "Delta") between a set of invoice matching parameters and the current set of invoice matching parameters. The algorithm can then select an overall cost as an optimal overall cost (and thus, select an alternate set of invoice matching parameters as an optimal set of invoice matching parameters). In the illustrated embodiment of FIG. 4, the set of invoice matching parameters identified in FIG. 4 as "Cycle 9" is selected as the optimal set of invoice matching parameters.

Figure 5:
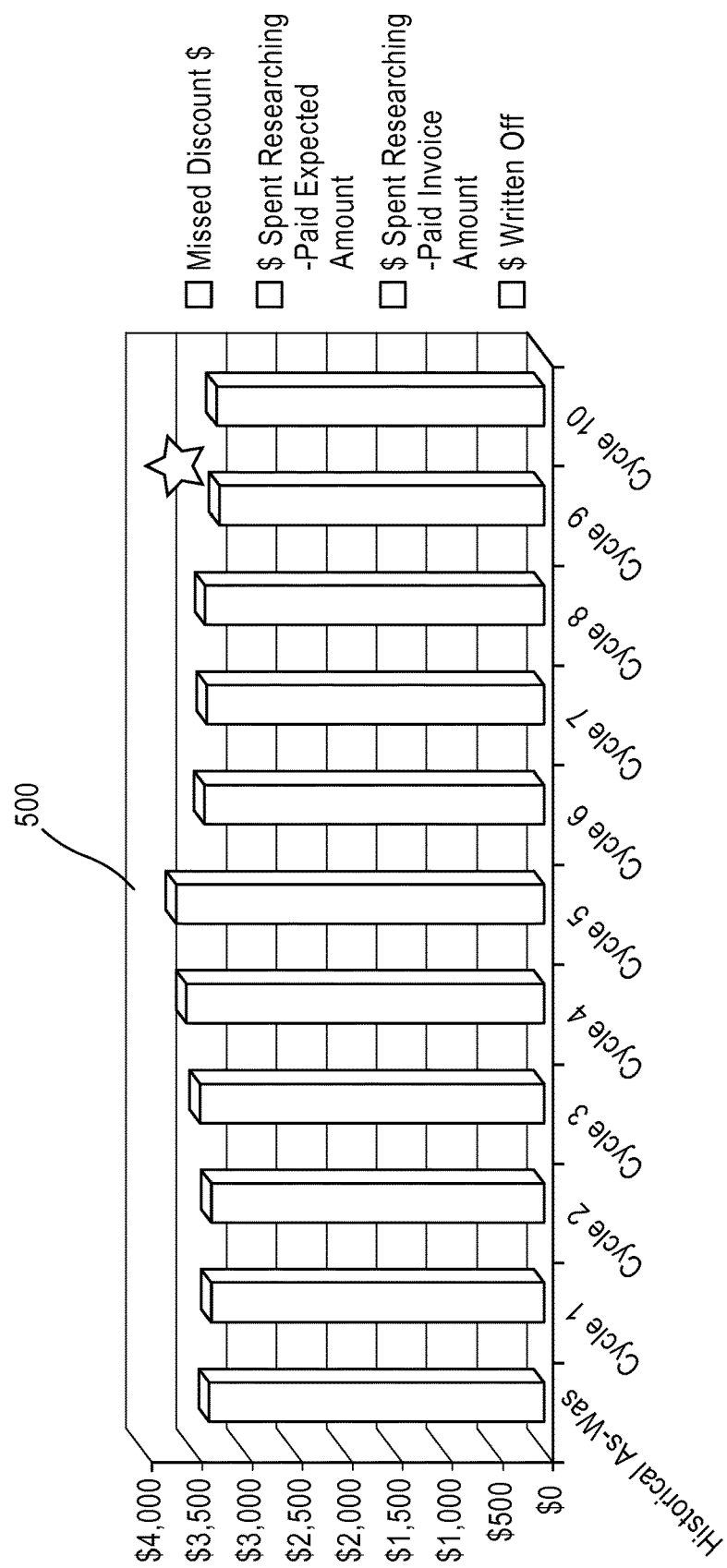
FIG. 5 illustrates an example graph that displays the example results of FIG. 4, and that determines an optimal set of invoice matching tolerance parameters, according to an embodiment of the invention.

FIG. 5 illustrates an example graph 500 that displays results 400 of FIG. 4, and that determines an optimal set of invoice matching tolerance parameters, according to an embodiment of the invention. Graph 500 displays the individual cost amounts for each set of invoice matching parameters in a bar-graph format. According to the embodiment, the set of invoice matching parameters identified in FIG. 5 as "Cycle 9" is identified as the optimal set of invoice matching parameters by displaying a star icon above the bar-graph that represents the set of invoice matching parameters.

Figure 6:
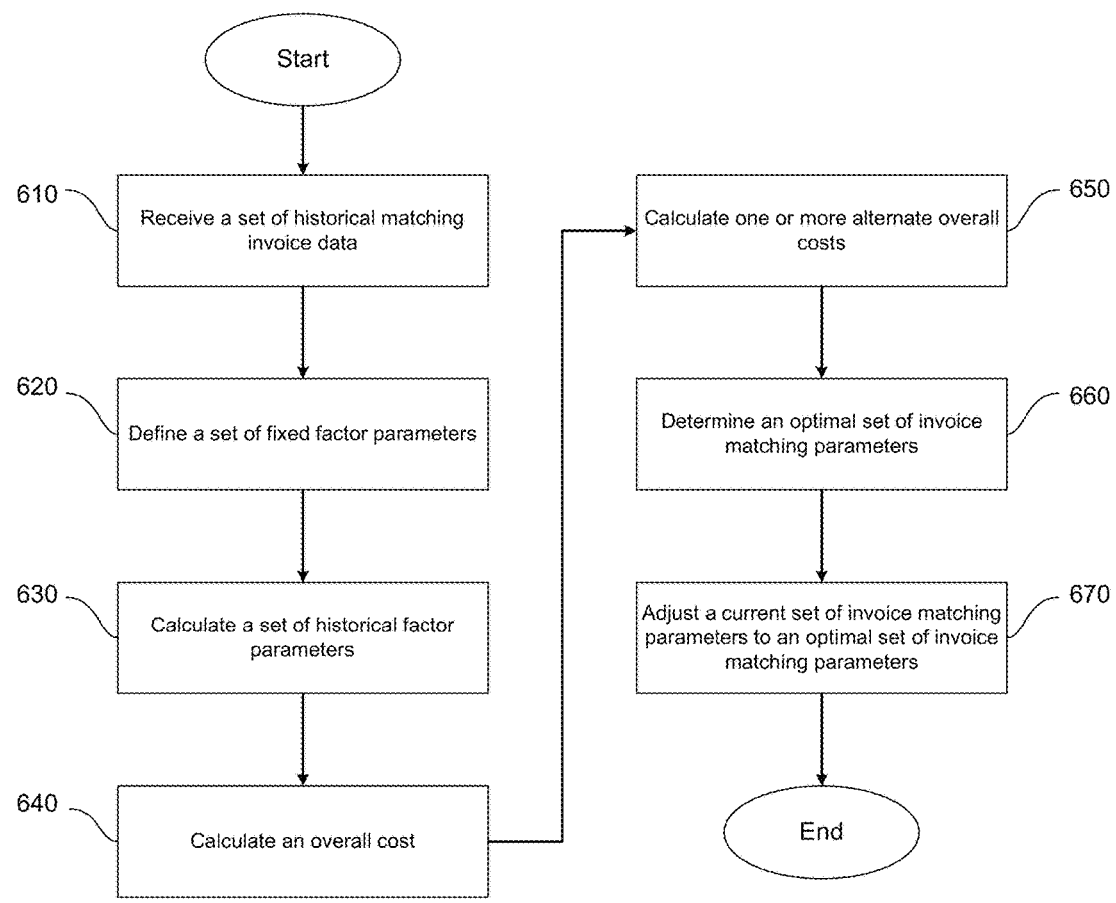
FIG. 6 illustrates a flow diagram of the functionality of a configurable invoice matching optimization module, according to an embodiment of the invention.

FIG. 6 illustrates a flow diagram of the functionality of a configurable invoice matching optimization module (such as configurable invoice matching optimization module 16 of FIG. 1), according to an embodiment of the invention. In one embodiment, the functionality of the flow diagram of FIG. 6 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 610. At 610, a set of historical invoice matching data is received. The set of historical invoice matching data includes invoices classified by an invoice matching engine and resolution actions initiated by the invoice matching engine. The invoice matching engine matches invoices with purchase documents based on a current set of invoice matching parameters. In certain embodiments, the invoice matching engine classifies the invoices based on a current set of invoice matching tolerance parameters, and the invoice matching engine initiates the resolution actions based on a current set of invoice matching action parameters.

In certain embodiments, the current set of invoice matching tolerance parameters defines whether the invoice matching engine classifies an invoice as one of: an exact match with a purchase document; a match within tolerance with the purchase document; or a non-match with the purchase document. Further, in certain embodiments, the current set of invoice matching action parameters defines a resolution action that the invoice matching engine initiates in response to classifying the invoice.

In certain embodiments, the current set of invoice matching tolerance parameters includes a cost tolerance parameter that defines a cost amount threshold that determines an amount that a cost amount of an invoice can deviate from a cost amount of a purchase document, where the invoice is considered by the invoice matching engine to match the purchase document within tolerance. In some of these embodiments, the current set of invoice matching tolerance parameters further includes a quantity tolerance parameter that defines a quantity amount threshold that determines an amount that a quantity amount of an invoice can deviate from a quantity amount of a purchase document, where the invoice is considered by the invoice matching engine to match the purchase document within tolerance.

In certain embodiments, the current set of invoice matching parameters includes: an exact match action parameter that defines a resolution action that the invoice matching engine initiates in response to classifying the invoice as an exact match with the purchase document; a tolerance match action parameter that defines a resolution action that the invoice matching engine initiates in response to classifying the invoice as a match within tolerance with the purchase document; and a non-match action parameter that defines a resolution action that the invoice matching engine initiates in response to classifying the invoice as a non-match with the purchase document.

In certain embodiments, the resolution action that the invoice matching engine initiates in response to classifying the invoice as an exact match is automatically paying an invoiced amount of the invoice. In some of these embodiments, the resolution action that the invoice matching engine initiates in response to classifying the invoice as a match within tolerance is one of: automatically paying the invoiced amount of the invoice; or automatically paying an expected amount of the invoice and automatically generating a debit memo for a difference of the invoiced amount and the expected amount. Further, in some of these embodiments, the resolution action that the invoice matching engine initiates in response to classifying the invoice as a non-match is manually resolving a discrepancy between the invoice and the purchase document.

In certain embodiments, the set of historical invoice matching data is defined by a historical invoice matching data parameter that defines a time period, where an invoice date of each invoice of the set of historical invoice matching data is within the time period, and wherein a resolution date of each resolution action of the set of historical invoice matching data is within the time period. The flow then proceeds to 620.

At 620, a set of fixed factor parameters is defined, where the set of fixed factor parameters define cost values associated with the invoice matching engine initiating resolution actions. In some of these embodiments, the set of fixed factor parameters include an average cost of resolving cost discrepancy parameter that defines an average cost of resolving a cost discrepancy, and an average cost of resolving quantity discrepancy parameter that defines an average cost of resolving a quantity discrepancy. The flow then proceeds to 630.

At 630, a set of historical factor parameters is calculated, where the set of historical factor parameters define metric values based on the historical invoice matching data. In some of these embodiments, the set of historical factor parameters include: a historical exact match parameter that defines a percentage of invoices of the set of historical invoice matching data that were exactly matched; a historical tolerance match parameter that defines a percentage of invoices of the set of historical invoice matching data that were matched within tolerance; a historical cost discrepancy parameter that defines a percentage of invoices of the set of historical invoice matching data that resulted in a cost discrepancy; a historical quantity discrepancy parameter that defines a percentage of invoices of the set of historical invoice matching data that resulted in a quantity discrepancy; a historical average unit cost deviation parameter that defines an average unit cost deviation for cost discrepancies; a historical average unit quantity deviation parameter that defines an average unit quantity deviation for quantity discrepancies; a historical disputed debit memo parameter that defines a percentage of invoices of the set of historical invoice matching data that resulted in a debit memo being generated and disputed; a historical average invoice payment deviation parameter that defines whether a final deviation between a paid amount and an invoiced amount is greater than, less than, or equal to a cost of resolving discrepancies; and a historical average expected payment deviation parameter that defines whether a final deviation between a paid amount and an expected amount is greater than, less than, or equal to a cost of resolving discrepancies. The flow then proceeds to 640.

At 640, a current overall cost associated with the invoice matching engine initiating resolution actions is calculated based on the current set of invoice matching parameters, the fixed factor parameters, and the historical factor parameters. In certain embodiments, the current set of invoice matching parameters includes the current set of invoice matching tolerance parameters and the current set of invoice matching action parameters. The flow then proceeds to 650.

At 650, one or more alternate overall costs associated with the invoice matching engine initiating resolution actions are calculated based on one or more alternate set of invoice matching parameters. In certain embodiments, an alternate set of invoice matching parameters includes an alternate set of invoice matching tolerance parameters and an alternate set of invoice matching action parameters. Further in certain embodiments, the current overall cost and the one or more alternate costs are calculated according to a processing level parameter that defines a level of granularity for the calculations. In some of these embodiments, the level of granularity comprises at least one of: a global level where an overall cost is calculated for all suppliers and item types; a supplier level where an overall cost is calculated for each supplier; or a supplier/item type level where an overall cost is calculated for each supplier and item type. The flow then proceeds to 660.

At 660, an optimal set of invoice matching parameters is determined based on comparing the current overall cost with the one or more alternate overall costs. In certain embodiments, an optimal set of invoice matching parameters includes an optimal set of invoice matching tolerance parameters and an optimal set of invoice matching action parameters. The flow then proceeds to 670.

At 670, the current set of invoice matching parameters is adjusted to the optimal set of invoice matching parameters. In certain embodiments, the current set of invoice matching tolerance parameters is adjusted to the optimal set of invoice matching tolerance parameters, and the current set of invoice matching action parameters is adjusted to the optimal set of invoice matching action parameters. The flow then ends.

Thus, a system is provided that can automatically optimize an invoice matching engine by automatically optimizing a set of invoice matching parameters utilized by the invoice matching engine. The automatic optimization can be based on an analysis of historical invoice matching data and a calculation of alternate sets of invoice matching parameters. The automatic optimization can eliminate a need to constantly evaluate invoice matching parameters manually, and can offer a level of certainty that the invoice matching parameters have been set optimally. The analysis of the historical invoice matching data and the calculation of alternate sets of invoice matching parameters can involve the processing of a significant number of sets of alternate invoice matching parameters, and can provide a dollar-fordollar comparison between all the sets of alternate invoice matching parameters in order to determine an optimal set of invoice matching parameters.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to automatically optimize a configurable invoice matching engine, the automatic optimizing comprising:

receiving a set of historical invoice matching data that comprises invoices classified by the invoice matching engine and resolution actions initiated by the invoice matching engine, wherein the invoice matching engine classifies the invoices based on a current set of invoice matching tolerance parameters and initiates the resolution actions based on a current set of invoice matching action parameters, the current set of invoice matching tolerance parameters including an exact match parameter, a tolerance match parameter and a non-match parameter, and the current set of invoice matching action parameters including:

an exact match parameter that defines an exact match resolution action that the invoice matching engine initiates in response to classifying the invoice as an exact match with the purchase document, a tolerance match parameter that defines a tolerance resolution action that the invoice matching engine initiates in response to classifying the invoice as a match within a tolerance with the purchase document, and a non-match parameter that defines a non-match resolution action that the invoice matching engine initiates in response to classifying the invoice as a non-match with the purchase document;

defining a processing level parameter that defines a level of granularity for calculating an overall cost, the level of granularity including a global level, a supplier level and an item level, the global level providing improved processor performance over the supplier level and the item level, and the supplier level providing improved processor performance over the item level, the global level calculating an overall cost for all suppliers and item types, the supplier level calculating an overall cost for each supplier, and the item level calculating an overall cost for each supplier and item type;

defining a set of fixed factor parameters that define cost values associated with the invoice matching engine initiating resolution actions;

calculating a set of historical factor parameters that define metric values based on the historical invoice matching data;

calculating a current overall cost associated with the invoice matching engine initiating resolution actions based on the level of granularity, the current set of invoice matching tolerance parameters, the current set of invoice matching action parameters, the set of fixed factor parameters, and the set of historical factor parameters;

calculating a plurality of alternate overall costs, associated with the invoice matching engine initiating resolution actions, based on the level of granularity and a plurality of alternate sets of invoice matching tolerance parameters, each alternate set including at least one different tolerance parameter value;

determining an optimal set of invoice matching tolerance parameters based on comparing the current overall cost with the plurality of alternate overall costs; and adjusting the current set of invoice matching tolerance parameters to the optimal set of invoice matching tolerance parameters.

2. The computer-readable medium of claim 1, wherein calculating the alternate overall costs, associated with the invoice matching engine initiating resolution actions, is further based on a plurality of alternate sets of invoice matching action parameters, each alternate set including at least one different action parameter.

3. The computer-readable medium of claim 1, wherein the current set of invoice matching tolerance parameters comprises a cost tolerance parameter that defines a cost amount threshold that determines an amount that a cost amount of an invoice can deviate from a cost amount of a purchase document, where the invoice is considered by the invoice matching engine to match the purchase document within tolerance.

4. The computer-readable medium of claim 1, wherein current set of invoice matching tolerance parameters comprises a quantity tolerance parameter that defines a quantity amount threshold that determines an amount that a quantity amount of an invoice can deviate from a quantity amount of a purchase document, where the invoice is considered by the invoice matching engine to match the purchase document within tolerance.

5. The computer-readable medium of claim 1, wherein the resolution action that the invoice matching engine initiates in response to classifying the invoice as an exact match comprises automatically paying an invoiced amount of the invoice;

wherein the resolution action that the invoice matching engine initiates in response to classifying the invoice as a match within tolerance comprises at least one of: automatically paying the invoiced amount of the invoice; or automatically paying an expected amount of the invoice and automatically generating a debit memo for a difference of the invoiced amount and the expected amount; and wherein the resolution action that the invoice matching engine initiates in response to classifying the invoice as a non-match comprises manually resolving a discrepancy between the invoice and the purchase document.

6. The computer-readable medium of claim 1, wherein the set of historical invoice matching data is defined by a historical invoice matching data parameter that defines a time period, wherein an invoice date of each invoice of the set of historical invoice matching data is within the time period, and wherein a resolution date of each resolution action of the set of historical invoice matching data is within the time period.

7. The computer-readable medium of claim 1, wherein the set of fixed factor parameters comprises:
an average cost of resolving cost discrepancy parameter that defines an average cost of resolving a cost discrepancy; and
an average cost of resolving quantity discrepancy parameter that defines an average cost of resolving a quantity discrepancy.

8. The computer-readable medium of claim 1, wherein the set of historical factor parameters comprises:
a historical exact match parameter that defines a percentage of invoices of the set of historical invoice matching data that were exactly matched;
a historical tolerance match parameter that defines a percentage of invoices of the set of historical invoice matching data that were matched within tolerance;
a historical cost discrepancy parameter that defines a percentage of invoices of the set of historical invoice matching data that resulted in a cost discrepancy;
a historical quantity discrepancy parameter that defines a percentage of invoices of the set of historical invoice matching data that resulted in a quantity discrepancy;
a historical average unit cost deviation parameter that defines an average unit cost deviation for cost discrepancies;
a historical average unit quantity deviation parameter that defines an average unit quantity deviation for quantity discrepancies;
a historical disputed debit memo parameter that defines a percentage of invoices of the set of historical invoice matching data that resulted in a debit memo being generated and disputed;
a historical average invoice payment deviation parameter that defines whether a final deviation between a paid amount and an invoiced amount is greater than, less than, or equal to a cost of resolving discrepancies; and
a historical average expected payment deviation parameter that defines whether a final deviation between a paid amount and an expected amount is greater than, less than, or equal to a cost of resolving discrepancies.

9. A computer-implemented method for automatically optimizing a configurable invoice matching engine, the computer-implemented method comprising:
receiving a set of historical invoice matching data that comprises invoices classified by the invoice matching engine and resolution actions initiated by the invoice matching engine, wherein the invoice matching engine classifies the invoices based on a current set of invoice matching tolerance parameters and initiates the resolution actions based on a current set of invoice matching action parameters, the current set of invoice matching tolerance parameters including an exact match parameter, a tolerance match parameter and a non-match parameter, and the current set of invoice matching action parameters including:
an exact match parameter that defines an exact match resolution action that the invoice matching engine initiates in response to classifying the invoice as an exact match with the purchase document,
a tolerance match parameter that defines a tolerance resolution action that the invoice matching engine initiates in response to classifying the invoice as a match within a tolerance with the purchase document, and
a non-match parameter that defines a non-match resolution action that the invoice matching engine initiates in response to classifying the invoice as a non-match with the purchase document;
defining a processing level parameter that defines a level of granularity for calculating an overall cost, the level of granularity including a global level, a supplier level and an item level, the global level providing improved processor performance over the supplier level and the item level, and the supplier level providing improved processor performance over the item level, the global level calculating an overall cost for all suppliers and item types, the supplier level calculating an overall cost for each supplier, and the item level calculating an overall cost for each supplier and item type;
defining a set of fixed factor parameters that define cost values associated with the invoice matching engine initiating resolution actions;
calculating a set of historical factor parameters that define metric values based on the historical invoice matching data;
calculating a current overall cost associated with the invoice matching engine initiating resolution actions based on the level of granularity, the current set of invoice matching tolerance parameters, the current set of invoice matching action parameters, the set of fixed factor parameters, and the set of historical factor parameters;
calculating a plurality of alternate overall costs, associated with the invoice matching engine initiating resolution actions, based on the level of granularity and a plurality of alternate sets of invoice matching tolerance parameters, each alternate set including at least one different tolerance parameter value;
determining an optimal set of invoice matching tolerance parameters based on comparing the current overall cost with the plurality of alternate overall costs; and
adjusting the current set of invoice matching tolerance parameters to the optimal set of invoice matching tolerance parameters.

10. The computer-implemented method of claim 9, further comprising:
calculating the one or more alternate overall costs associated with the invoice matching engine initiating resolution actions based on one or more alternate set of invoice matching action parameters;
determining an optimal set of invoice matching action parameters based on comparing the current overall cost with the one or more alternate overall costs; and
adjusting the current set of invoice matching action parameters to the optimal set of invoice matching action parameters.

11. The computer-implemented method of claim 9, wherein the current set of invoice matching tolerance parameters comprises a cost tolerance parameter that defines a cost amount threshold that determines an amount that a cost amount of an invoice can deviate from a cost amount of a purchase document, where the invoice is considered by the invoice matching engine to match the purchase document within tolerance.

12. A system comprising a processor coupled to a memory and a database, the memory storing instructions that, when executed by the processor, cause the processor to automatically optimize a configurable invoice matching engine, the optimizing comprising:
receiving a set of historical invoice matching data that comprises invoices classified by the invoice matching engine and resolution actions initiated by the invoice matching engine, wherein the invoice matching engine classifies the invoices based on a current set of invoice matching tolerance parameters and initiates the resolution actions based on a current set of invoice matching action parameters, the current set of invoice matching tolerance parameters including an exact match parameter, a tolerance match parameter and a non-match parameter, and the current set of invoice matching action parameters including:
an exact match parameter that defines an exact match resolution action that the invoice matching engine initiates in response to classifying the invoice as an exact match with the purchase document,
a tolerance match parameter that defines a tolerance resolution action that the invoice matching engine initiates in response to classifying the invoice as a match within a tolerance with the purchase document, and
a non-match parameter that defines a non-match resolution action that the invoice matching engine initiates in response to classifying the invoice as a non-match with the purchase document;
defining a processing level parameter that defines a level of granularity for calculating an overall cost, the level of granularity including a global level, a supplier level and an item level, the global level providing improved processor performance over the supplier level and the item level, and the supplier level providing improved processor performance over the item level, the global level calculating an overall cost for all suppliers and item types, the supplier level calculating an overall cost for each supplier, and the item level calculating an overall cost for each supplier and item type;
defining a set of fixed factor parameters that define cost values associated with the invoice matching engine initiating resolution actions;
calculating a set of historical factor parameters that define metric values based on the historical invoice matching data;
calculating a current overall cost associated with the invoice matching engine initiating resolution actions based on the level of granularity, the current set of invoice matching tolerance parameters, the current set of invoice matching action parameters, the set of fixed factor parameters, and the set of historical factor parameters;
calculating a plurality of alternate overall costs, associated with the invoice matching engine initiating resolution actions, based on the level of granularity and a plurality of alternate sets of invoice matching tolerance parameters, each alternate set including at least one different tolerance parameter value;
determining an optimal set of invoice matching tolerance parameters based on comparing the current overall cost with the plurality of alternate overall costs; and
adjusting the current set of invoice matching tolerance parameters to the optimal set of invoice matching tolerance parameters.

13. The system of claim 12,
wherein calculating the alternate overall costs is further based on one or more alternate set of invoice matching action parameters;
wherein the optimizing further comprises:
determining an optimal set of invoice matching action parameters based on comparing the current overall cost with the one or more alternate overall costs; and
adjusting the current set of invoice matching action parameters to the optimal set of invoice matching action parameters.

14. The system of claim 12, wherein the current set of invoice matching tolerance parameters comprises a cost tolerance parameter that defines a cost amount threshold that determines an amount that a cost amount of an invoice can deviate from a cost amount of a purchase document, where the invoice is considered by the invoice matching engine to match the purchase document within tolerance.

15. The computer-implemented method of claim 9,
wherein the resolution action that the invoice matching engine initiates in response to classifying the invoice as an exact match comprises automatically paying an invoiced amount of the invoice;
wherein the resolution action that the invoice matching engine initiates in response to classifying the invoice as a match within tolerance comprises at least one of: automatically paying the invoiced amount of the invoice; or automatically paying an expected amount of the invoice and automatically generating a debit memo for a difference of the invoiced amount and the expected amount; and
wherein the resolution action that the invoice matching engine initiates in response to classifying the invoice as a non-match comprises manually resolving a discrepancy between the invoice and the purchase document.

16. The system of claim 12,
wherein the resolution action that the invoice matching engine initiates in response to classifying the invoice as an exact match comprises automatically paying an invoiced amount of the invoice;
wherein the resolution action that the invoice matching engine initiates in response to classifying the invoice as a match within tolerance comprises at least one of: automatically paying the invoiced amount of the invoice; or automatically paying an expected amount of the invoice and automatically generating a debit memo for a difference of the invoiced amount and the expected amount; and
wherein the resolution action that the invoice matching engine initiates in response to classifying the invoice as a non-match comprises manually resolving a discrepancy between the invoice and the purchase document.

17. The computer-implemented method of claim 9, wherein the set of historical factor parameters comprises:
a historical exact match parameter that defines a percentage of invoices of the set of historical invoice matching data that were exactly matched;
a historical tolerance match parameter that defines a percentage of invoices of the set of historical invoice matching data that were matched within tolerance;
a historical cost discrepancy parameter that defines a percentage of invoices of the set of historical invoice matching data that resulted in a cost discrepancy;

a historical quantity discrepancy parameter that defines a percentage of invoices of the set of historical invoice matching data that resulted in a quantity discrepancy;

a historical average unit cost deviation parameter that defines an average unit cost deviation for cost discrepancies;

a historical average unit quantity deviation parameter that defines an average unit quantity deviation for quantity discrepancies;

a historical disputed debit memo parameter that defines a percentage of invoices of the set of historical invoice matching data that resulted in a debit memo being generated and disputed;

a historical average invoice payment deviation parameter that defines whether a final deviation between a paid amount and an invoiced amount is greater than, less than, or equal to a cost of resolving discrepancies; and a historical average expected payment deviation parameter that defines whether a final deviation between a paid amount and an expected amount is greater than, less than, or equal to a cost of resolving discrepancies.

18. The system of claim 12, wherein the set of historical factor parameters comprises:

a historical exact match parameter that defines a percentage of invoices of the set of historical invoice matching data that were exactly matched;

a historical tolerance match parameter that defines a percentage of invoices of the set of historical invoice matching data that were matched within tolerance;

a historical cost discrepancy parameter that defines a percentage of invoices of the set of historical invoice matching data that resulted in a cost discrepancy;

a historical quantity discrepancy parameter that defines a percentage of invoices of the set of historical invoice matching data that resulted in a quantity discrepancy;

a historical average unit cost deviation parameter that defines an average unit cost deviation for cost discrepancies;

a historical average unit quantity deviation parameter that defines an average unit quantity deviation for quantity discrepancies;

a historical disputed debit memo parameter that defines a percentage of invoices of the set of historical invoice matching data that resulted in a debit memo being generated and disputed;

a historical average invoice payment deviation parameter that defines whether a final deviation between a paid amount and an invoiced amount is greater than, less than, or equal to a cost of resolving discrepancies; and a historical average expected payment deviation parameter that defines whether a final deviation between a paid amount and an expected amount is greater than, less than, or equal to a cost of resolving discrepancies.

\* \* \* \* \*